United States Patent
Teyeb et al.

(10) Patent No.: US 12,010,537 B2
(45) Date of Patent: Jun. 11, 2024

(54) ON TRIGGERING MEASUREMENTS IN LTE-NR INTERWORKING

(71) Applicant: TELEFONAKTIEBOLAGET LM ERICSSON (PUBL), Stockholm (SE)

(72) Inventors: Oumer Teyeb, Solna (SE); Icaro L. J. Da Silva, Solna (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 1000 days.

(21) Appl. No.: 16/768,024

(22) PCT Filed: Nov. 28, 2018

(86) PCT No.: PCT/IB2018/059424
§ 371 (c)(1),
(2) Date: May 28, 2020

(87) PCT Pub. No.: WO2019/106575
PCT Pub. Date: Jun. 6, 2019

(65) Prior Publication Data
US 2023/0067324 A1    Mar. 2, 2023

Related U.S. Application Data

(60) Provisional application No. 62/591,764, filed on Nov. 28, 2017.

(51) Int. Cl.
*H04W 76/15* (2018.01)
*H04W 24/10* (2009.01)

(52) U.S. Cl.
CPC ........... *H04W 24/10* (2013.01); *H04W 76/15* (2018.02)

(58) Field of Classification Search
CPC . H04W 24/10; H04W 76/15; H04W 36/0088; H04W 36/0069; H04W 88/06
See application file for complete search history.

(56) References Cited

U.S. PATENT DOCUMENTS

| | | |
|---|---|---|
| 2013/0189971 A1 | 7/2013 | Callender et al. |
| 2015/0271713 A1 | 9/2015 | Kim et al. |

(Continued)

FOREIGN PATENT DOCUMENTS

| | | |
|---|---|---|
| CN | 105052188 B | 4/2019 |
| CN | 106068658 A | 2/2020 |

(Continued)

OTHER PUBLICATIONS

Huawei, et al., S-measure in LTE for EN-DC, R2-1712570 (update of R2-1710577), 3GPP TSG-RAN WG2#100, Reno, USA, Nov. 27-Dec. 1, 2017.

(Continued)

*Primary Examiner* — Chuong A Ngo
(74) *Attorney, Agent, or Firm* — Ericsson Inc.

(57) ABSTRACT

According to certain embodiments, a method in a wireless device is provided. The wireless device is currently connected to a first radio access node and configured with an s-measure by the first radio access node that controls when the wireless device starts performing measurements. Upon configuration by the first radio access node to perform measurements on a first radio access technology, RAT, the wireless device starts to perform the measurements when the first radio access node's s-measure criteria is fulfilled. Upon configuration by the first radio access node to perform measurements on a second RAT, the wireless device starts to perform the measurements on the second RAT whether the first radio access node's s-measure criteria is fulfilled or not.

19 Claims, 9 Drawing Sheets

(56) References Cited

U.S. PATENT DOCUMENTS

| | | |
|---|---|---|
| 2016/0021592 A1 | 1/2016 | Vesely |
| 2020/0162953 A1* | 5/2020 | Kim .................. H04L 5/0051 |
| 2020/0229052 A1 | 7/2020 | Zhang et al. |

FOREIGN PATENT DOCUMENTS

| | | |
|---|---|---|
| EP | 3122104 B1 | 3/2019 |
| KR | 1020150109839 A | 10/2015 |
| WO | 2019062581 A1 | 4/2019 |

OTHER PUBLICATIONS

Intel Corporation, s-Measure for NR-SS and CSI-RS in NR, R2-1712647, 3GPP TSG RAN WG2 Meeting #100, Reno, United States, Nov. 30-Dec. 3, 2017.
Ericsson, s-Measure configuration and UE behaviour, Tdoc R2-1817628, 3GPP TSG-RAN WG2#104, Spokane, US, Nov. 12-16, 2018.
Ericsson, s-Measure configuration and UE behaviour, Tdoc R2-1714139, 3GPP TSG-RAN WG2#100, Reno, Nevada, USA, Nov. 27-Dec. 1, 2017.

* cited by examiner

ON TRIGGERING MEASUREMENTS IN LTE-NR INTERWORKING

This application is a 371 of International Application No. PCT/IB2018/059424, filed Nov. 28, 2018, which claims the benefit of U.S. Provisional Application No. 62/591,764, filed Nov. 28, 2017, the disclosures of which are fully incorporated herein by reference.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In LTE, the concept of s-Measure is used to reduce the neighbor cell measurement overhead for the UE. When the PCell measurements as performed by the UE is above this network configured s-Measure value, the UE refrains from performing the neighboring cell measurements.

According to current specification TS 36.331, i.e., LTE, when E-UTRAN configures a measurement, the IE MeasConfig specifies measurements to be performed by the UE. That IE includes the "s-Measure" parameter with following definition: "PCell quality threshold controlling whether or not the UE is required to perform measurements of intra-frequency, inter-frequency and inter-RAT neighboring cells. Value "0" indicates to disable s-Measure."

In the E-UTRA specification, the following procedural text exists when it comes to the UE actions related to s-Measure:

5.5.2 Measurement configuration
. . .
   1> if the received measConfig includes the s-Measure:
      2> set the parameter s-Measure within VarMeasConfig to the lowest value of the RSRP ranges indicated by the received value of s-Measure;
. . .
5.5.3 Performing measurements
The UE shall:
. . .
   1> for each measId included in the measIdList within VarMeasConfig:
      2> if the purpose for the associated reportConfig is set to reportCGI:
. . .
      2> if the ul-DelayConfig is configured for the associated reportConfig
. . .
      2> else:
         3> if a measurement gap configuration is setup; or
         3> if the UE does not require measurement gaps to perform the concerned measurements:
            4> if s-Measure is not configured; or
            4> if is configured and the PCell RSRP, after layer 3 filtering, is lower than this value; or
. . .
         4> if the ue-RaxTimeDiffPeriodical is configured in the associated reportConfig:
            5> perform the UE Rx-Tx time difference measurements on the PCell;
         4> if the reportSSTD-Meas is set to true in the associated reportConfig:
            5> perform SSTD measurements between the PCell and the PSCell;
         4> if the measRSSI-ReportConfig is configured in the associated reportConfig:
            5> perform the RSSI and channel occupancy measurements on the frequency indicated in the associated measObject;
      2> perform the evaluation of reporting criteria as specified in 5.5.4

In LTE-NR interworking, it has been agreed that the UE will be configured with two s-measure values, one associated with the measConfig from MN (LTE) and another one from the measConfig from SN(NR).

There currently exist certain challenge(s). For example, the behavior of the UE with regard to these two different s-measures is not agreed upon yet. A straightforward adoption of the behavior specified for LTE (as discussed above) will be:

The UE will not start measuring any measurement configured by the MN, be it intra-frequency LTE measurement, inter-frequency LTE measurement or inter-RAT measurement, until the PCell quality drops below the quality specified by the s-measure associated with the MN.

Similarly, the UE will not start measuring any measurement configured by the SN, be it intra-frequency NR measurement, inter-frequency NR measurement or inter-RAT measurement, until the PSCell quality drops below the quality specified by the s-measure associated with the SN.

Thus, the adoption of the UE's behavior with regard to s-measure in LTE to LTE-NR interworking will result the UE treating the two s-measures independently and also associating them only with the measurements that are configured by the same node that configured the concerned s-measure. This means if the LTE radio conditions are very good (i.e. PCell RSRP>S-measure), the UE will not perform any measurements configured by the MN, even if these measurements were related to NR frequencies.

A downside of this approach can be illustrated with these two scenarios below:

SN communicates to the MN that it is overloaded, and MN configures a measurement object on an NR frequency and associates a B1 event to it (i.e. intra-RAT neighbor better than a threshold) to find an SN that it wants to change the SN to.

MN wants to perform inter-RAT handover to NR due to load conditions in the LTE network (also assuming standalone NR). The MN configures a measurement object on an NR frequency and associates a B1 event to it, to find a gNB that it can handover the UE to.

In both cases, if the UE's connection to the LTE are good, from radio point of view (i.e. PCell RSRP>>S-measure_LTE), the UE will not start performing the measurement on the NR frequency specified in the measurement object and hence the B1 event will not be triggered. As such, the MN will not get the measurement result needed to identify the target gNB to perform the SN change or the inter-RAT HO to.

SUMMARY

Certain aspects of the present disclosure and their embodiments may provide solutions to these or other challenges. In particular, some embodiments are concerned with a dual connectivity (DC) scenario where the UE could operate or is already operating in a dual connectivity mode between two RATs (e.g. LTE and NR), and the UE is configured with two s-measures from each RAT.

According to certain embodiments, a method in a wireless device is provided. The wireless device is currently connected to a first radio access node and configured with an s-measure by the first radio access node that controls when the wireless device starts performing measurements. Upon configuration by the first radio access node to perform measurements on a first radio access technology, RAT, the wireless device starts to perform the measurements when the first radio access node's s-measure criteria is fulfilled. Upon configuration by the first radio access node to perform measurements on a second RAT, the wireless device starts to perform the measurements on the second RAT whether the first radio access node's s-measure criteria is fulfilled or not.

According to certain embodiments, a method in a wireless device is provided. The wireless device is operating in dual connectivity between a first radio access node employing a first radio access technology, RAT, and a second radio access node employing a second RAT. The wireless device is currently connected to both the first radio access node and the second radio access node and is configured with a first s-measure from the first radio access node and a second s-measure from the second radio access node. Upon configuration by the first radio access node to perform measurements on the first RAT, the wireless device starts to perform the measurements when the first radio access node's s-measure criteria is fulfilled. Upon configuration by the first radio access node to perform measurements on the second RAT, the wireless device starts to perform the measurements on the second RAT, whether the first radio access node's s-measure criteria is fulfilled or not.

According to certain embodiments, a wireless device currently connected to a first radio access node and configured with at least one s-measure by the first radio access node that controls when the wireless device starts performing measurements, the wireless device includes processing circuitry and power supply circuitry configured to supply power to the wireless device. Upon configuration by the first radio access node to perform measurements on a first radio access technology, RAT, the processing circuitry is operable to start to perform the measurements when the first radio access node's s-measure criteria is fulfilled. Upon configuration by the first radio access node to perform measurements on a second RAT, the processing circuitry is operable to start to perform the measurements on the second RAT, whether the first radio access node's s-measure criteria is fulfilled or not.

According to certain embodiments, a wireless device operates in dual connectivity between a first radio access node employing a first radio access technology, RAT, and a second radio access node employing a second RAT. The wireless device is currently connected to both the first radio access node and the second radio access node and is configured with a first s-measure from the first radio access node and a second s-measure from the second radio access node, the wireless device includes processing circuitry and power supply circuitry configured to supply power to the wireless device. Upon configuration by the first radio access node to perform measurements on the first RAT, the wireless device starts to perform the measurements when the first radio access node's s-measure criteria is fulfilled. Upon configuration by the first radio access node to perform measurements on the second RAT, the wireless device starts to perform the measurements on the second RAT, whether the first radio access node's s-measure criteria is fulfilled or not.

According to certain embodiments, a system for triggering measurements in LTE-NR interworking is provided. The system includes a first radio access node employing a first RAT, a second radio access node employing a second RAT, and a wireless device currently connected to the first radio access node. The wireless device is configured with an s-measure by the first radio access node that controls when the wireless device starts performing measurements. The wireless device is also configured, upon configuration by the first radio access node, to perform measurements on the first RAT such that the wireless devices starts to perform the measurements when the first radio access node's s-measure criteria is fulfilled. The wireless device is further configured, upon configuration by the first radio access node, to perform measurements on the second RAT such that the wireless device starts to perform the measurements on the second RAT whether or not an s-measure criteria associated with the first RAT is fulfilled.

Certain embodiments may provide one or more of the following technical advantage(s). For instance, a technical advantage may be that some embodiments allow the network possibly configuring the UE with s-Measure thresholds per RS Type, either a single one configurable per RS Type or multiple ones (i.e. one per RS Type). In addition, a technical advantage may be that the network may configure the UE with s-Measure thresholds per measurement quantity (e.g. RSRP, RSRQ, SINR, etc.), either a single one configurable per quantity or multiple ones (i.e. one per quantity).

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
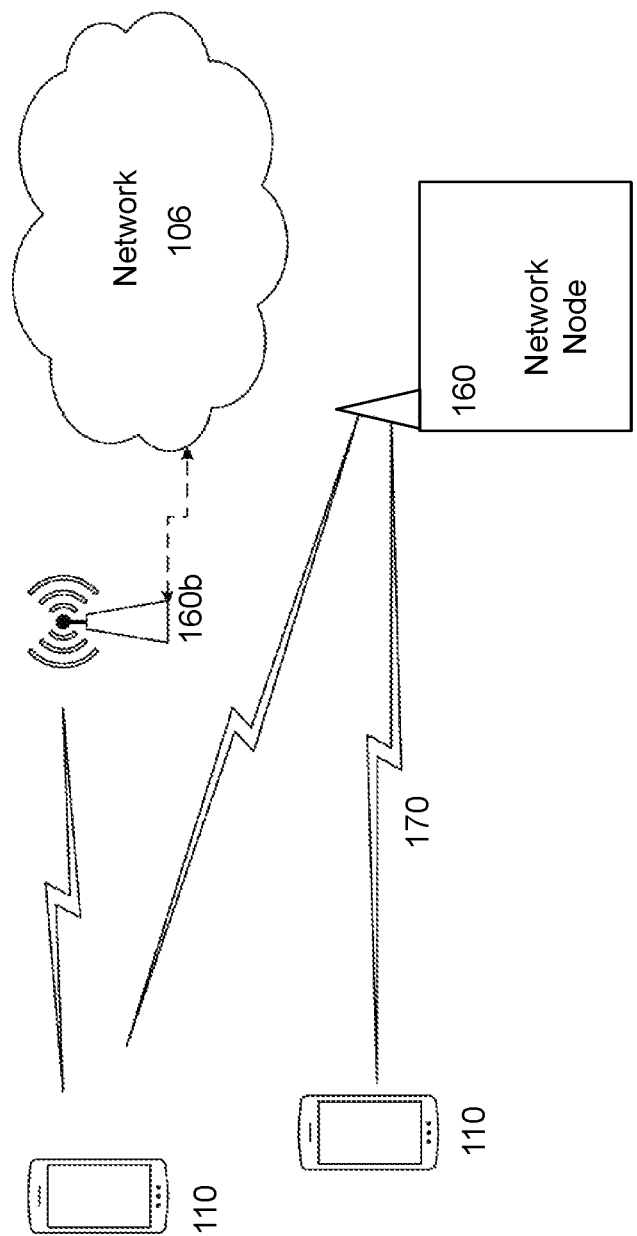
FIG. 1 illustrates a wireless network, according to certain embodiments.

Certain aspects of the present disclosure and their embodiments may provide solutions that address one or more of the issues disclosed herein. For example, according to certain embodiments, a UE that is operating or is capable of operating in a dual connectivity (DC) mode between two radio access technologies (RATs) may be configured with an s-measure configuration for each RAT.

Some embodiments operate according to two scenarios:

Before DC is setup: When a UE that is connected to a first RAT only (e.g. LTE) is configured with a measurement configuration regarding another RAT (e.g. NR), it starts performing the measurements whether the s-measure criteria of the first RAT are fulfilled or not.

After DC is setup:
Option 1: The same behavior as before DC is setup is applied (i.e. if the first RAT configures measurements regarding the second RAT, the UE performs the measurements whether the s-measure criteria of the first RAT are fulfilled or not)

Option 2: The s-measure configured by the second RAT are used to control the triggering of measurements configured by the first RAT that are concerning the second RAT (i.e. UE starts performing measurements related to the second RAT, whether they are configured by the first or the second RAT, when the SN's s-measure criteria are fulfilled).

In a particular embodiment, the first RAT may be LTE and the second RAT may be NR. In another particular embodiment, the first RAT may be NR and the second RAT may be LTE.

According to certain embodiments, the method may be performed before DC is set up. For example, in a particular embodiment, a method in a user equipment (UE) capable of operating in dual connectivity between a first radio access node employing a first RAT and a second radio access node employing a second RAT, and currently connected to the first node may be configured with an s-measure by the first node that controls when the user equipment starts performing measurements. Upon configuration by the first node to perform measurements on the second RAT, the method may include starting to perform the measurements on the second RAT, whether the first node's s-measure criteria is fulfilled or not.

According to certain embodiments, the method may be performed after DC is set up. For example, in a particular embodiment, a method may be performed in a UE operating in dual connectivity between a first radio access node employing a first RAT and a second radio access node employing a second RAT, where the UE is currently connected to both the first node and the second node and is configured with an s-measure from the first node and another s-measure from the second node. Upon the fulfillment of second node's s-measure criteria, the method may include starting to perform the measurements for all measurements configured on the second RAT, whether these measurements were configured by the first node or the second node.

According to certain other embodiments, the method may be performed in a UE operating in dual connectivity between a first radio access node employing a first radio access technology (RAT) and a second radio access node employing a second radio access technology (RAT), where the UE is currently connected to both the first node and the second node and is configured with an s-measure from the first node and another s-measure from the second node. The method may include maintaining, by the UE, a parameter (e.g. inter-RAT-sMeasureActivate) that specifies the s-measure handling behavior during dual connectivity between two different RATs. If the inter-RAT-sMeasureActivate parameter is set to TRUE, upon the fulfillment of the second RAT's s-measure criteria, the UE may start to perform the measurements on the second RAT configured by the first node.

The embodiments contemplated above may be implemented within the embodiments described below with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

FIG. 1 illustrates a wireless network, according to certain embodiments. Although the subject matter described herein may be implemented in any appropriate type of system using any suitable components, the embodiments disclosed herein are described in relation to a wireless network, such as the example wireless network illustrated in FIG. 1. For simplicity, the wireless network of FIG. 1 only depicts network 106, network nodes 160 and 160*b*, and WDs 110, 110*b*, and 110*c*. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 2:
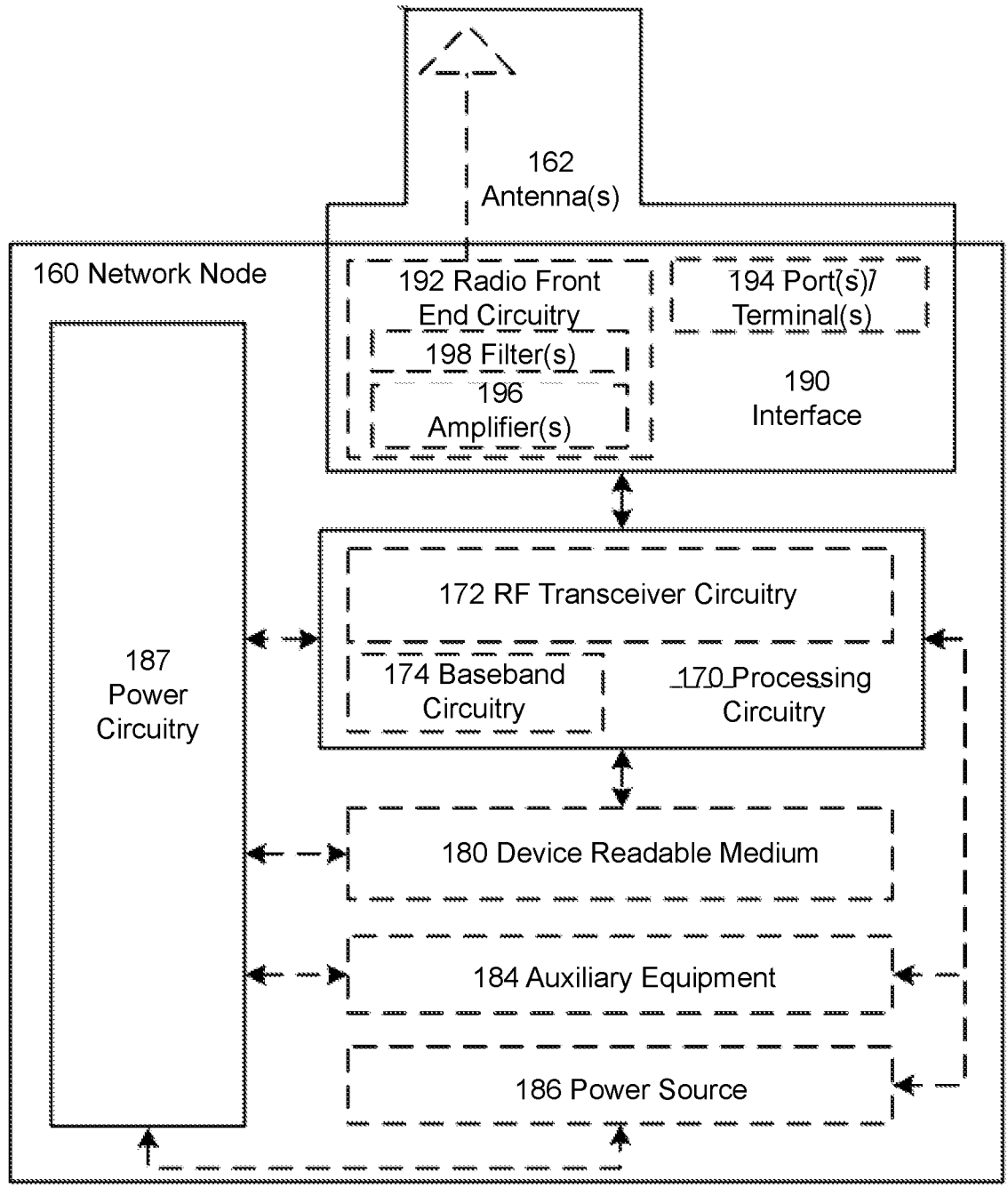
FIG. 2 illustrate an example network node, according to certain embodiments.

FIG. 2 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, and evolved Node Bs (eNBs)) gNB. Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 2, network node 160 includes processing circuitry 170, device readable medium 180, interface 190, auxiliary equipment 184, power source 186, power circuitry 187, and antenna 162. Although network node 160 illustrated in the example wireless network of FIG. 1 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 2 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

Figure 3:
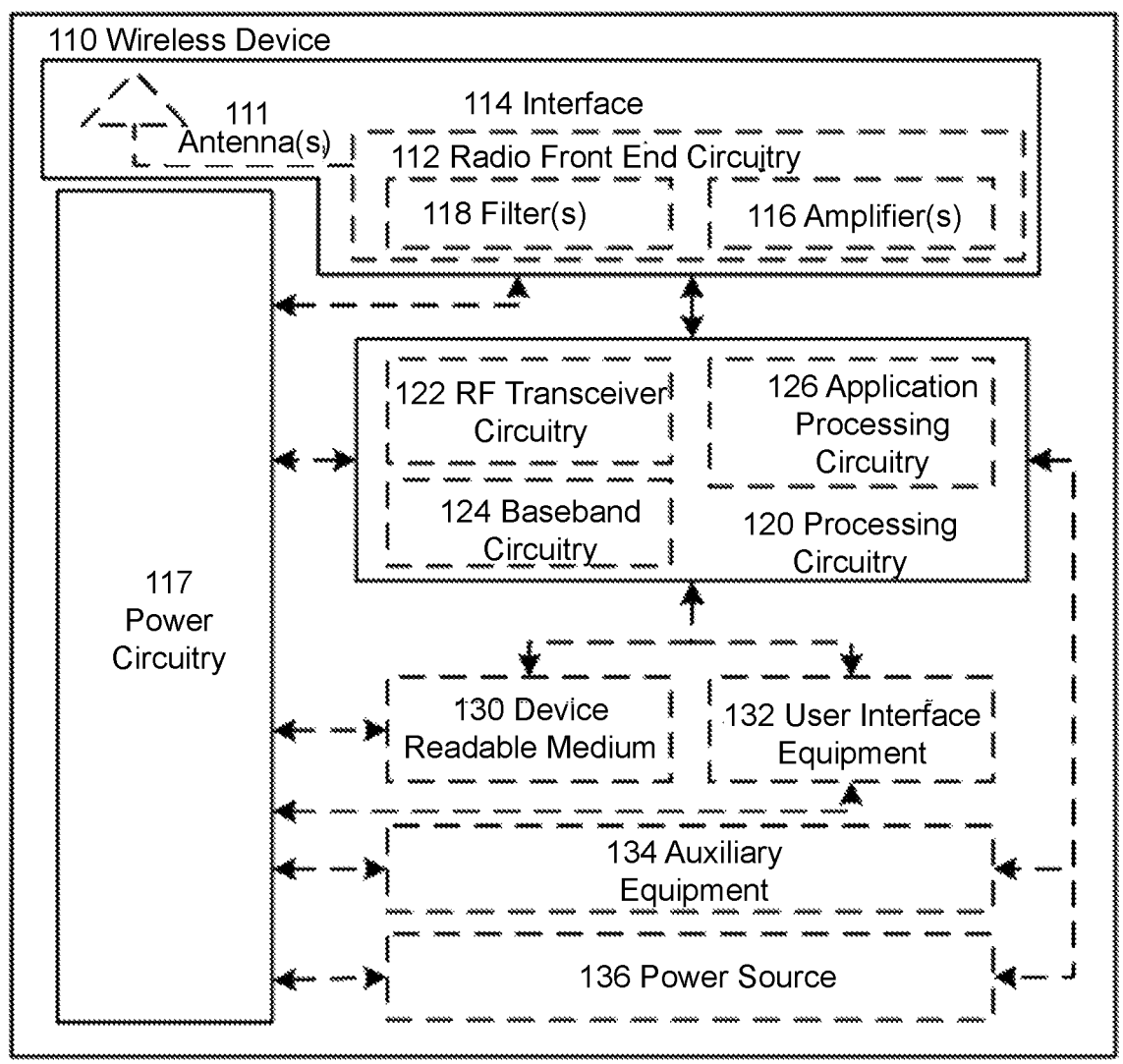
FIG. 3 illustrates an example wireless device, according to certain embodiments.

FIG. 3 illustrates an example wireless device (WD) 110, according to certain embodiments. As used herein, WD refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as a machine-type communication (MTC) device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 4:
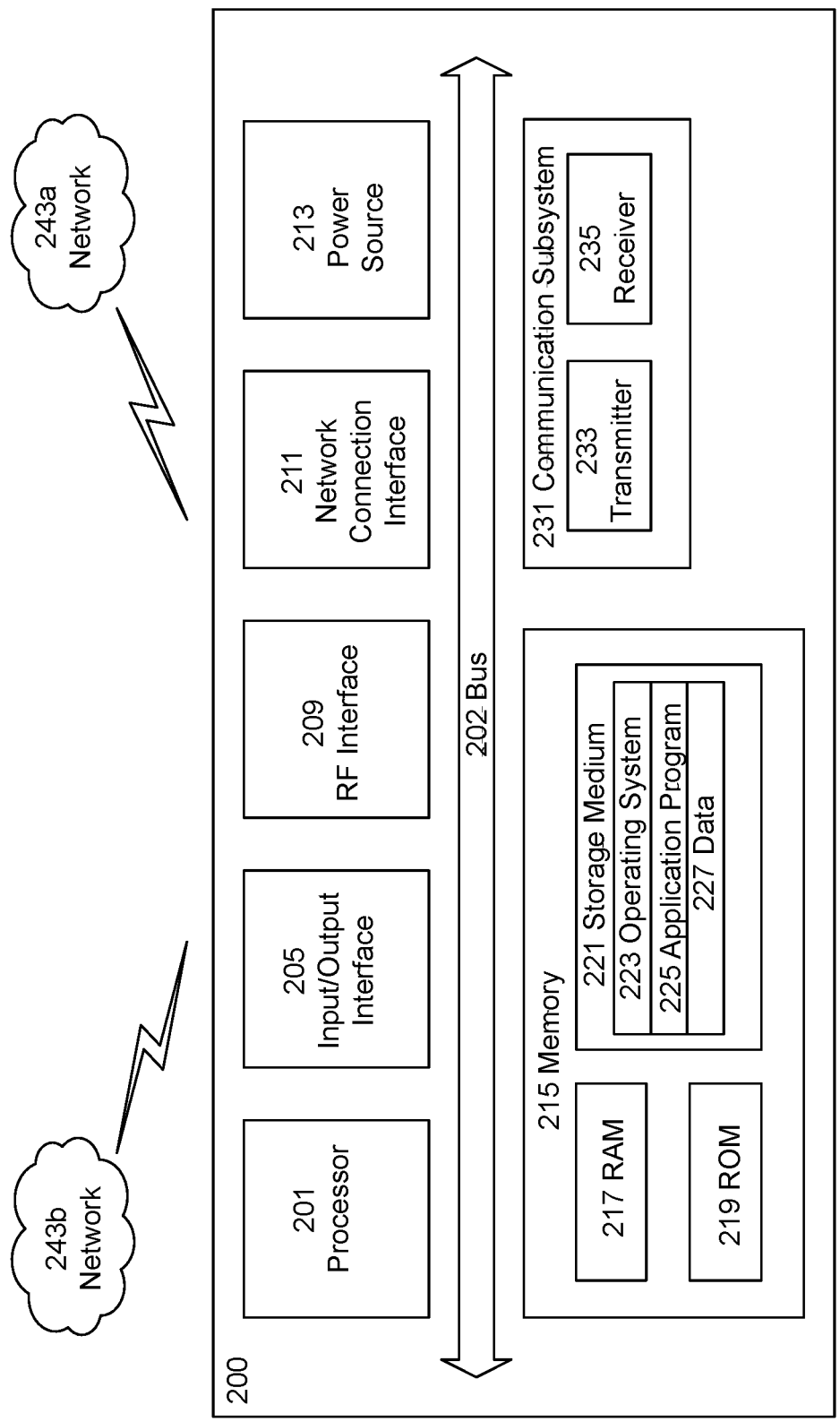
FIG. 4 illustrates an example user equipment (UE), according to certain embodiments.

FIG. 4 illustrates an example embodiment of a UE, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user. A UE may also comprise any UE identified by the $3^{rd}$ Generation Partnership Project (3GPP), including a NB-IoT UE that is not intended for sale to, or operation by, a human user. UE 200, as illustrated in FIG. 4, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 4 is a UE, the components discussed herein are equally applicable to a WD, and vice-versa.

In FIG. 4, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 4, or only a subset of the components. The level of integration between the components may vary from one UE to another UE. Further, certain UEs may contain multiple instances of a component, such as multiple processors, memories, transceivers, transmitters, receivers, etc.

In FIG. 4, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 4, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 4, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 5:
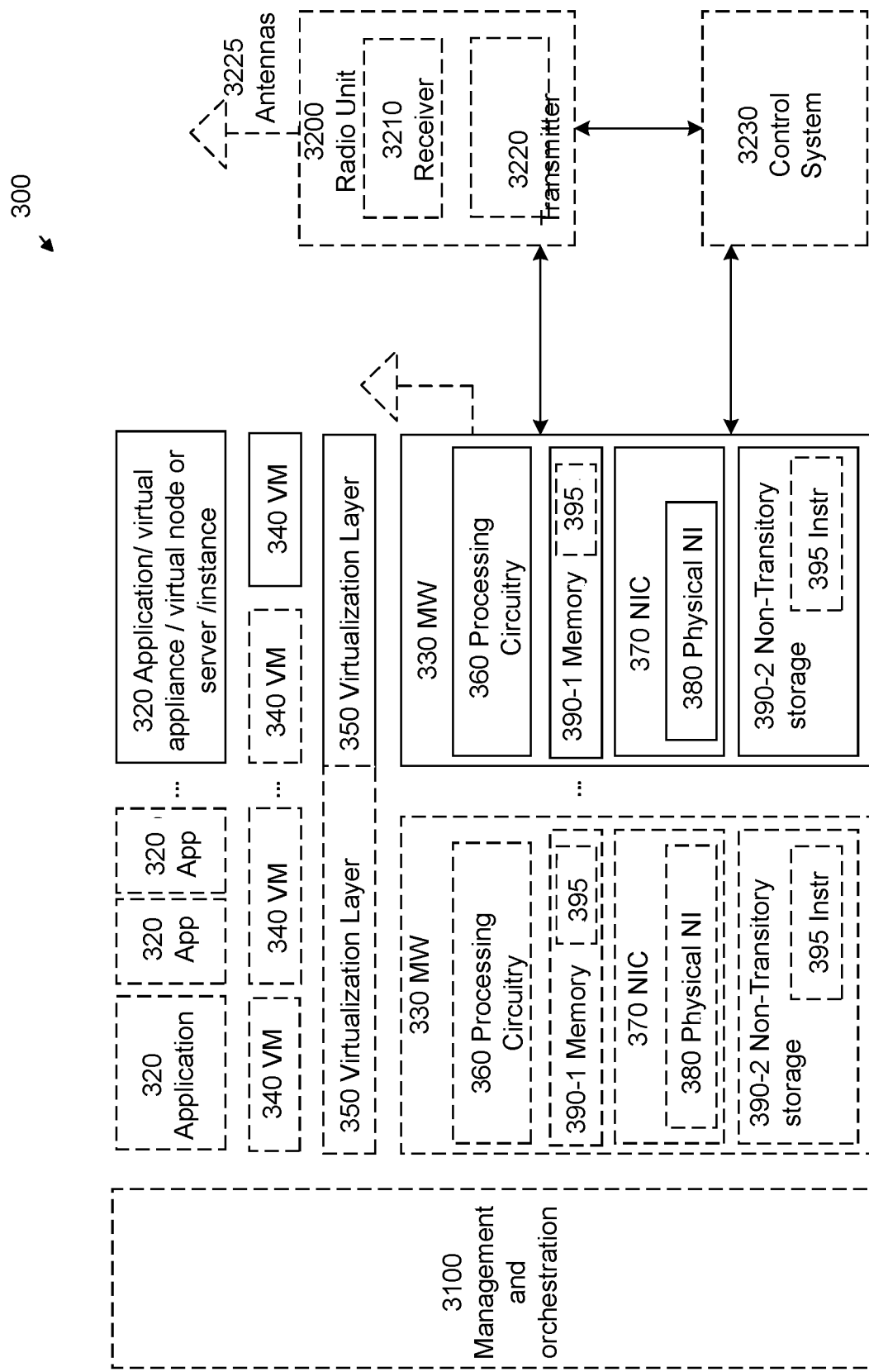
FIG. 5 illustrates an example virtualization environment in which functions implemented by some embodiments may be virtualized, according to certain embodiments.

FIG. 5 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 5, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 5.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 6:
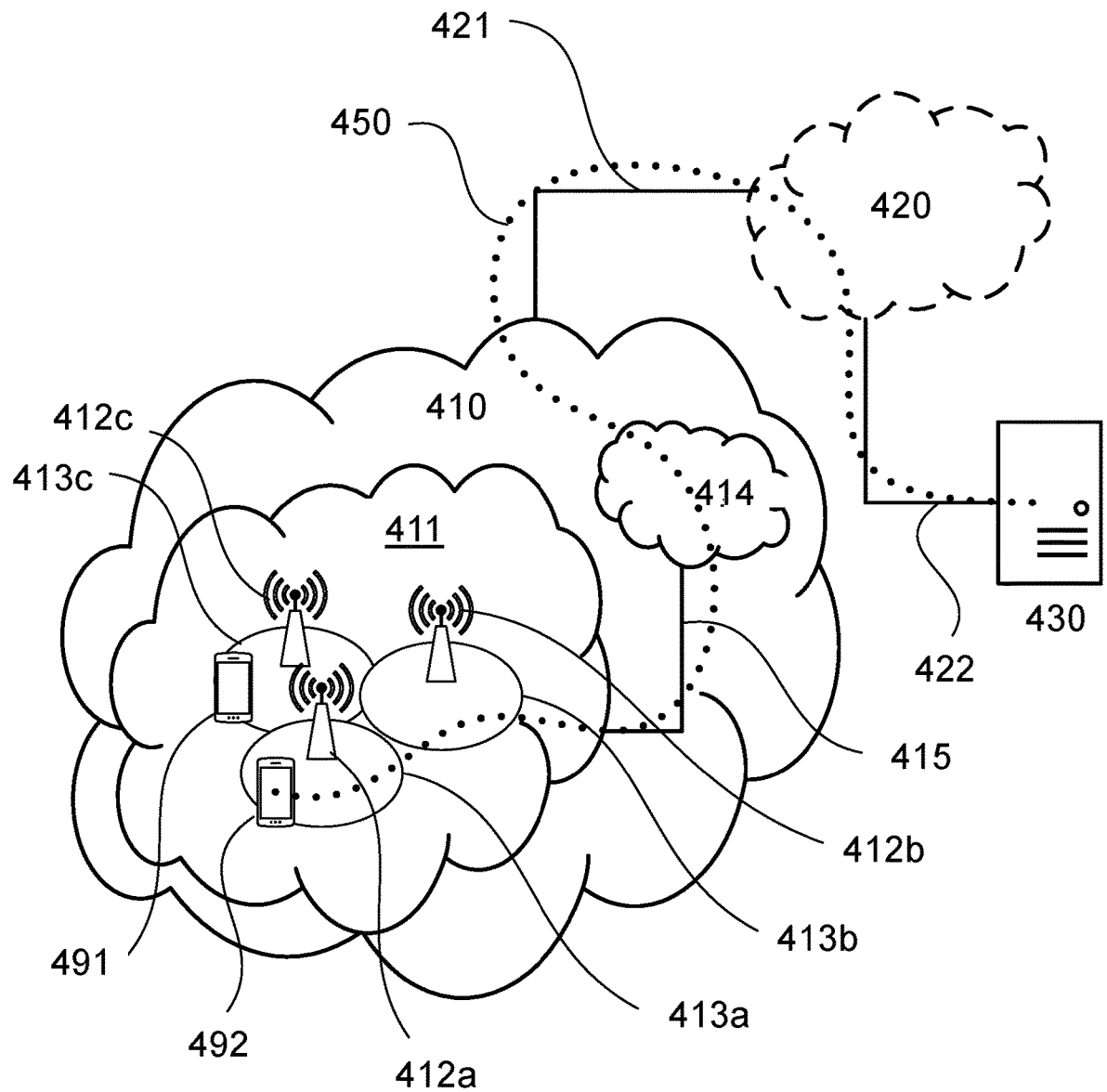
FIG. 6 illustrates an example telecommunication network connected via an intermediate network to a host computer, according to certain embodiments

FIG. 6 illustrates an example telecommunication network connected via an intermediate network to a host computer, according to certain embodiments. With reference to FIG. 6, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 6 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 7:
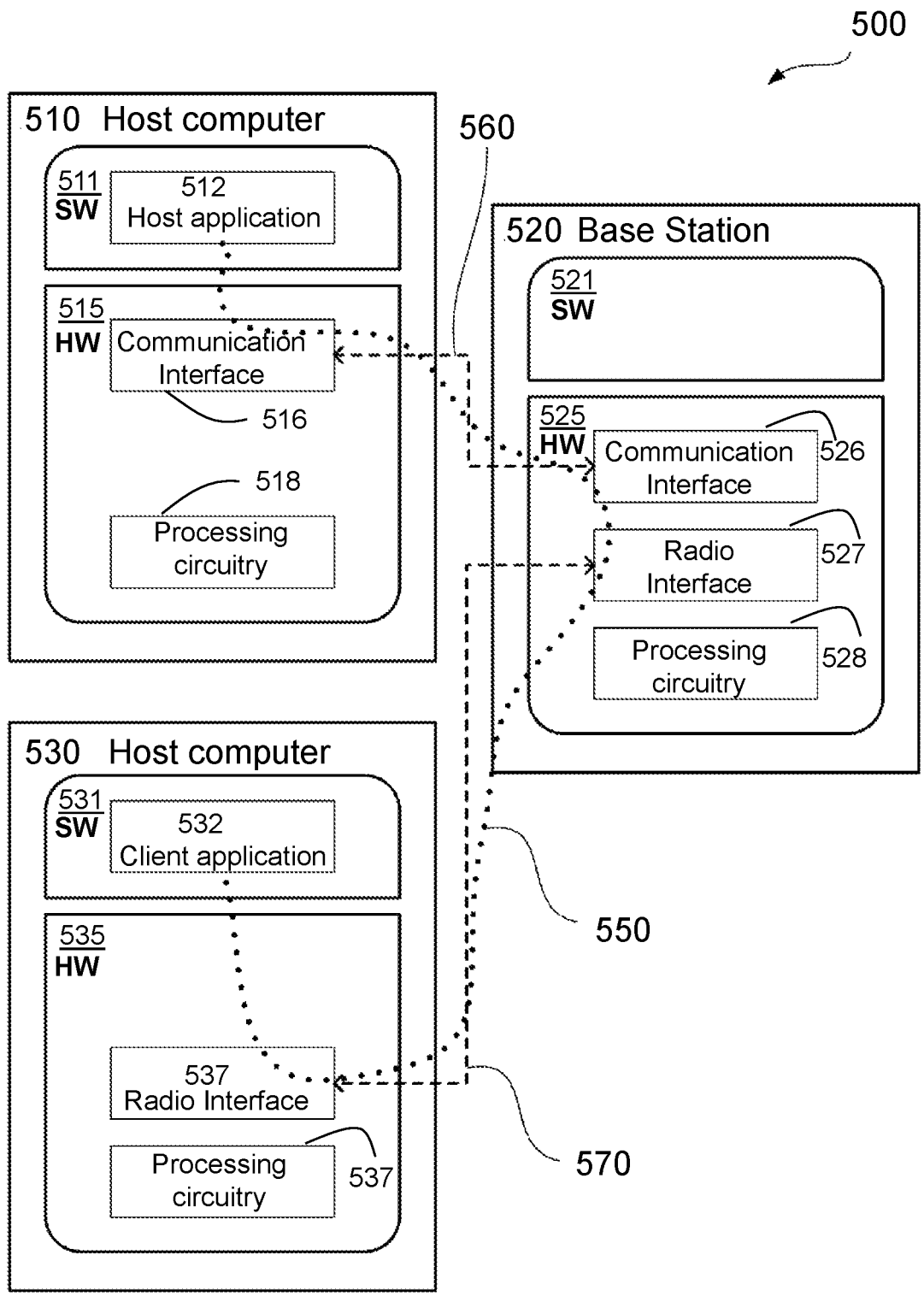
FIG. 7 illustrates an example host computer communicating via a base station with a user equipment over a partially wireless connection, according to some embodiments.

FIG. 7 illustrates an example host computer communicating via a base station with a user equipment over a partially wireless connection, according to some embodiments. Example implementations, in accordance with an embodiment, of the UE, base station and host computer discussed in the preceding paragraphs will now be described with reference to FIG. 7.

In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 7) served by base station 520. Communication interface 526 may be configured to facilitate connection 560 to host computer 510. Connection 560 may be direct or it may pass through a core network (not shown in FIG. 7) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 7 may be similar or identical to host computer 430, one of base stations 412a, 412b, 412c and one of UEs 491, 492 of FIG. 6, respectively. This is to say, the inner workings of these entities may be as shown in FIG. 7 and independently, the surrounding network topology may be that of FIG. 6.

In FIG. 7, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve power consumption and thereby provide benefits such as extended battery lifetime.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 8:
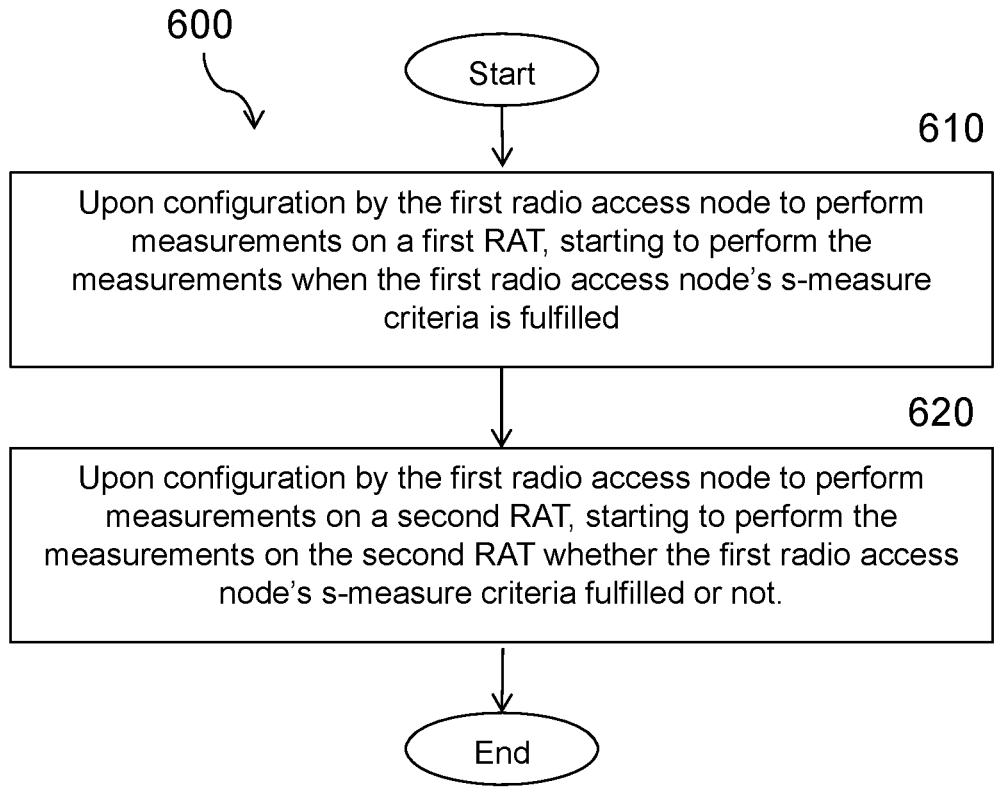
FIG. 8 illustrates an example method by a wireless device, according to certain embodiments.

FIG. 8 illustrates an example method 600 by a wireless device 110, according to certain embodiments. The wireless device 110 is currently connected to a first radio access node and is configured with at least one s-measure by the first radio access node that controls when wireless device 110 starts performing measurements. In a particular embodiment, wireless device 110 may include a UE such as UE 200 described above with regard to FIG. 4. In a particular embodiment, the first and second radio access nodes may include network nodes such as network node 160 described above with regard to FIG. 2.

At step 610, and upon configuration by the first radio access node to perform measurements on the first RAT, wireless device 110 starts to perform the measurements when the first radio access node's s-measure criteria is fulfilled.

At step 620, and upon configuration by the first radio access node to perform measurements on the second RAT, wireless device 110 starts to perform the measurements on the second RAT whether the first radio access node's s-measure criteria is fulfilled or not.

In a particular embodiment, wireless device 110 is capable of operating in dual connectivity between the first radio access node employing a first RAT and a second radio access node employing a second RAT.

In a particular embodiment, the first RAT is LTE and the second RAT is NR. In another embodiment, the first RAT is NR and the second RAT is LTE.

In a particular embodiment, wireless device 110 is served by the first radio access node in a first cell and zero or more secondary cells, and the first cell comprises a primary cell.

In a particular embodiment, the fulfillment of the first radio access node's s-measure criteria means that the when a cell quality level of the primary cell falls below a threshold indicated in the first radio access nodes's s-measure configuration.

Figure 9:
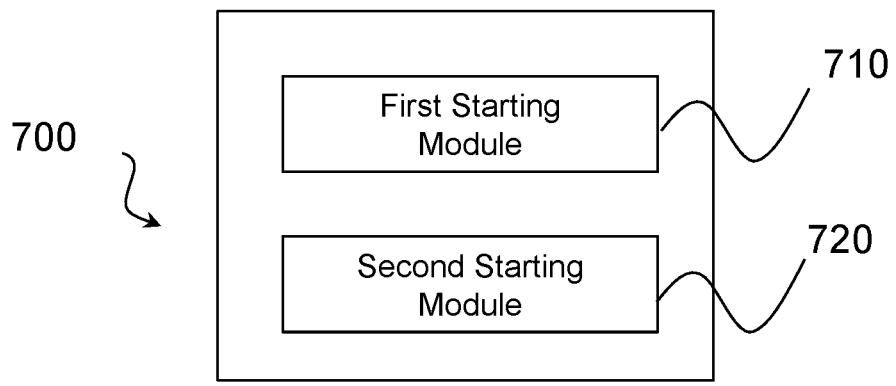
FIG. 9 illustrates an example virtual computing device, according to certain embodiments.

In certain embodiments, the method as described above may be performed by a computer networking virtual apparatus. FIG. 9 illustrates an example virtual computing device 700 for performing measurements in a wireless device capable of dual connectivity between a first radio access node employing a first RAT and a second radio access node employing a second RAT, according to certain embodiments. In certain embodiments, virtual computing device 700 may include modules for performing steps similar to those described above with regard to the method illustrated and described in FIG. 8. For example, virtual computing device 700 may include a first starting module 710, second starting module 720, and any other suitable modules for performing measurements in a wireless device capable of dual connectivity between a first radio access node employing a first RAT and a second radio access node employing a second RAT. In some embodiments, one or more of the modules may be implemented using processing circuitry 120 of FIG. 3. In certain embodiments, the functions of two or more of the various modules may be combined into a single module.

The first starting module 710 may perform certain of the starting to perform functions of virtual computing device 700. For example, in a particular embodiment, upon configuration by the first radio access node to perform measurements on the first RAT, first starting module 710 may start to perform the measurements when the first radio access node's s-measure criteria is fulfilled.

The second starting module 720 may perform certain other of the starting to perform functions of virtual computing device 700. For example, in a particular embodiment, upon configuration by the first radio access node to perform measurements on the second RAT, second starting module 720 may start to perform the measurements on the second RAT whether the first radio access node's s-measure criteria is fulfilled or not.

Other embodiments of virtual computing device 700 may include additional components beyond those shown in FIG. 9 that may be responsible for providing certain aspects of the wireless device's functionality, including any of the functionality described above and/or any additional functionality (including any functionality necessary to support the solutions described above). The various different types of wireless devices 110 may include components having the same physical hardware but configured (e.g., via programming) to support different radio access technologies, or may represent partly or entirely different physical components.

Figure 10:
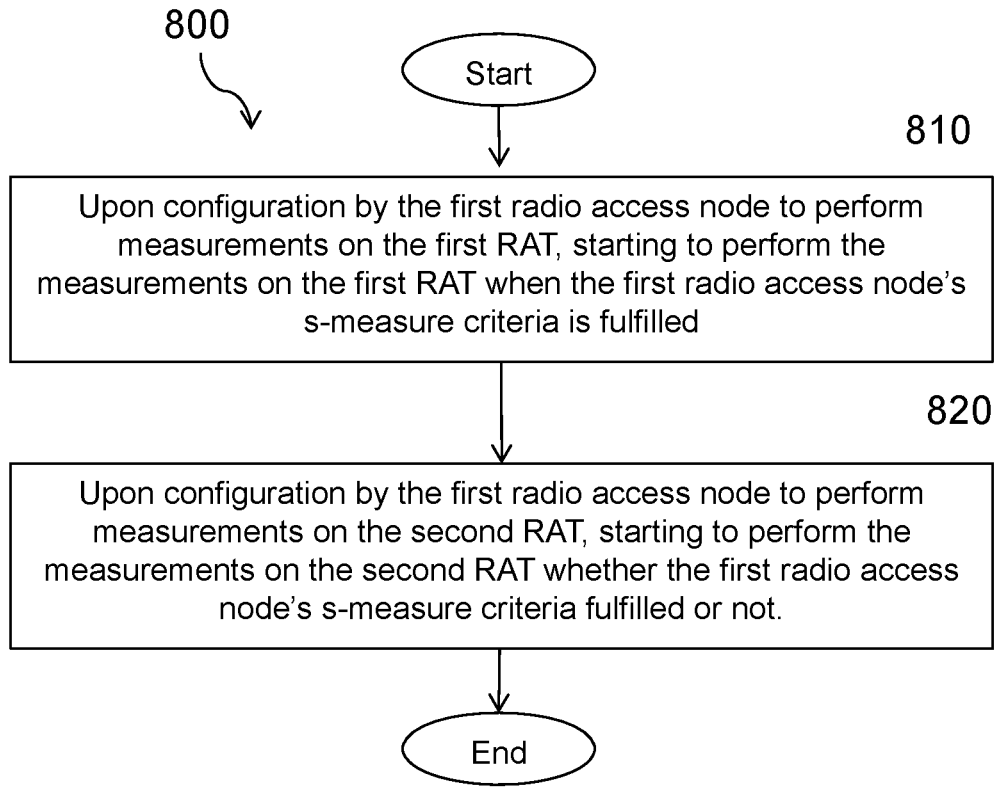
FIG. 10 illustrates an example method by a wireless device, according to certain embodiments.

FIG. 10 illustrates an example method 800 by a wireless device 110 operating in dual connectivity between a first radio access node employing a first RAT and a second radio access node employing a second RAT, according to certain embodiments. In the example method, wireless device 110 is currently connected to both the first radio access node and the second radio access node and is configured with a first s-measure from the first radio access node and a second s-measure from the second radio access node. In a particular embodiment, wireless device 110 may include a UE such as UE 200 described above with regard to FIG. 4. In a particular embodiment, the first and second radio access nodes may include network nodes such as network node 160 described above with regard to FIG. 2.

At step 810, and upon configuration by the first radio access node to perform measurements on the first RAT, wireless device 110 starts to perform the measurements on the first RAT when the first radio access node's s-measure criteria is fulfilled.

At step 820, and upon configuration by the first radio access node to perform measurements on the second RAT, wireless device 110 starts to perform the measurements on the second RAT whether or not the first radio access node's s-measure criteria is fulfilled.

In a particular embodiment, the method may further include wireless device starting to perform the measurements when the second radio access nodes s-measure criteria is fulfilled upon configuration by the second radio access node to perform measurements on the second RAT. Additionally, upon configuration by the second radio access node to perform measurements on the first RAT, wireless device 110 may start to perform the measurements on the first RAT whether the second radio access node's s-measure criteria is fulfilled or not.

In a particular embodiment, first RAT is LTE and the second RAT is NR. In another embodiment, the first RAT is NR and the second RAT is LTE.

In a particular embodiment, the wireless device is served by the first radio access node in a first cell and zero or more secondary cells, and the first cell is a PCell.

In a particular embodiment, the wireless device is served by the second radio access node in a second cell and zero or more secondary cells, and the second cell is a PSCell.

In a particular embodiment, the first radio access node's s-measure criteria is fulfilled when the cell quality level of the PCell falls below a threshold indicated in the first radio access nodes's s-measure configuration.

In a particular embodiment, the second radio access node's s-measure criteria is fulfilled when the cell quality level of the PSCell falls below a threshold indicated in the second radio access nodes's s-measure configuration.

Figure 11:
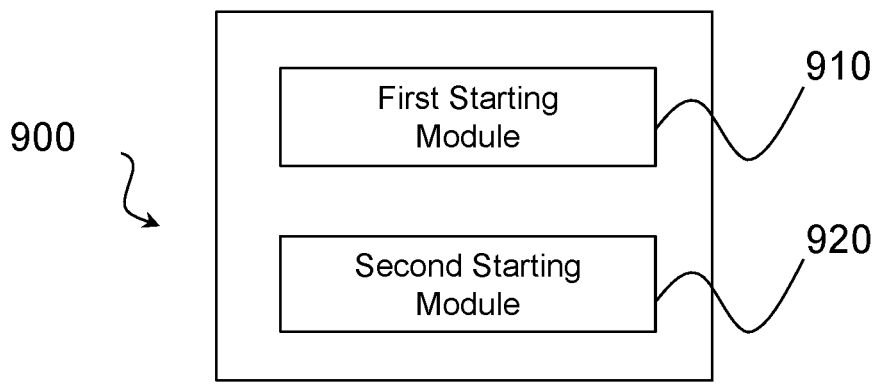
FIG. 11 illustrates an example virtual computing device, according to certain embodiments.

In certain embodiments, the method as described above may be performed by a computer networking virtual apparatus. FIG. 11 illustrates an example virtual computing device 900 for performing measurements in a wireless device operating in dual connectivity between a first radio access node employing a first RAT and a second radio access node employing a second RAT, according to certain embodiments. In certain embodiments, virtual computing device 900 may include modules for performing steps similar to those described above with regard to the method illustrated and described in FIG. 10. For example, virtual computing device 900 may include a first starting module 910, a second starting module 920, and any other suitable modules for starting to perform measurements in a wireless device operating in dual connectivity between a first radio access node employing a first RAT and a second radio access node employing a second RAT. In some embodiments, one or more of the modules may be implemented using processing circuitry 120 of FIG. 3. In certain embodiments, the functions of two or more of the various modules may be combined into a single module.

The first starting module 910 may perform certain of the starting to perform functions of virtual computing device 900. For example, in a particular embodiment, upon configuration by the first radio access node to perform measurements on the first RAT, first starting module 910 may start to perform the measurements on the first RAT when the first radio access node's s-measure criteria is fulfilled.

The second starting module 920 may perform certain other of the starting to perform functions of virtual computing device 900. For example, in a particular embodiment, upon configuration by the first radio access node to perform measurements on the second RAT, second starting module 920 may start to perform the measurements on the second RAT whether the first radio access node's s-measure criteria is fulfilled or not.

Other embodiments of virtual computing device 900 may include additional components beyond those shown in FIG. 11 that may be responsible for providing certain aspects of the wireless device's functionality, including any of the functionality described above and/or any additional functionality (including any functionality necessary to support the solutions described above). The various different types of wireless devices 110 may include components having the same physical hardware but configured (e.g., via programming) to support different radio access technologies, or may represent partly or entirely different physical components.

EXAMPLE EMBODIMENTS

Group A Embodiments

Embodiment 1 (Scenario 1: before DC is setup): A method in a user equipment (UE) capable of operating in dual connectivity between a first radio access node employing a first radio access technology (RAT) and a second radio access node employing a second radio access technology (RAT), and currently connected to the first node, and configured with an s-measure by the first node that controls when the user equipment starts performing measurements, the method comprising:
upon configuration by the first node to perform measurements on the second RAT, starting to perform the measurements on the second RAT, whether the first node's s-measure criteria is fulfilled or not.

Embodiment 2 (Scenario 2: after DC is setup): A method in a user equipment (UE) operating in dual connectivity between a first radio access node employing a first radio access technology (RAT) and a second radio access node employing a second radio access technology (RAT), and currently connected to both the first node and the second node, and configured with an s-measure from the first node and another s-measure from the second node, the method comprising:

upon the fulfillment of second node's s-measure criteria, starting to perform the measurements for all measurements configured on the second RAT, whether these measurements were configured by the first node or the second node.

Embodiment 3. A method in a user equipment (UE) operating in dual connectivity between a first radio access node employing a first radio access technology (RAT) and a second radio access node employing a second radio access technology (RAT), and currently connected to both the first node and the second node, and configured with an s-measure from the first node and another s-measure from the second node, the method comprising:

maintaining, by the UE, a parameter (e.g. inter-RAT-sMeasureActivate) that specifies the s-measure handling behavior during dual connectivity between two different RATs;

if the inter-RAT-sMeasureActivate parameter is set to TRUE, upon the fulfillment of the second RAT's s-measure criteria, starting to perform the measurements on the second RAT configured by the first node.

Embodiment 4. A method in a user equipment (UE) operating in dual connectivity between a first radio access node employing a first radio access technology (RAT) and a second radio access node employing a second radio access technology (RAT), and currently connected to both the first node and the second node, and configured with an s-measure from the first node and another s-measure from the second node, the method comprising:

maintaining, by the UE, two inter-RAT-sMeasureActivate parameters, inter-RAT-sMeasureActivate-firstRAT and inter-RAT-sMeasureActivate-secondRAT; and if inter-RAT-sMeasureActivate-firstRAT is set to TRUE, upon the fulfillment of the second RAT's s-measure criteria, starting to perform the measurements on the second RAT configured by the first node.

Embodiment 5. A method in a user equipment (UE) operating in dual connectivity between a first radio access node employing a first radio access technology (RAT) and a second radio access node employing a second radio access technology (RAT), and currently connected to both the first node and the second node, and configured with an s-measure from the first node and another s-measure from the second node, the method comprising:

maintaining, by the UE, two configuration parameters two inter-RAT-sMeasureActivate parameters, inter-RAT-sMeasureActivate-firstRAT and inter-RAT-sMeasure-Activate-secondRAT; and if inter-RAT-sMeasureActivate-secondRAT is set to TRUE, upon the fulfillment of the first RAT's s-measure criteria, starting to perform the measurements on the first RAT configured by the second node.

Embodiment 6. A method in a user equipment (UE) operating in dual connectivity between a first radio access node employing a first radio access technology (RAT) and a second radio access node employing a second radio access technology (RAT), and currently connected to both the first node and the second node, and configured with an s-measure from the first node and another s-measure from the second node, the method comprising:

upon the fulfillment of the second RAT's s-measure criteria, starting to perform all measurements configured by the first node.

Embodiment 7. A method in a user equipment (UE) operating in dual connectivity between a first radio access node employing a first radio access technology (RAT) and a second radio access node employing a second radio access technology (RAT), and currently connected to both the first node and the second node, and configured with an s-measure from the first node and another s-measure from the second node, the method comprising:

maintaining, by the UE, a parameter (e.g. inter-RAT-sMeasureActivateAll) that specifies the s-measure handling behavior during dual connectivity between two different RATs;

if this parameter is set to TRUE, upon the fulfillment of the second RAT's s-measure criteria, starting to perform all measurements configured by the first node.

Embodiment 8. A method in a user equipment (UE) operating in dual connectivity between a first radio access node employing a first radio access technology (RAT) and a second radio access node employing a second radio access technology (RAT), and currently connected to both the first node and the second node, and configured with an s-measure from the first node and another s-measure from the second node, the method comprising:

maintaining, by the UE, two configuration parameters (e.g. inter-RAT-sMeasureActivateAll-FirstRAT and inter-RAT-sMeasureActivateAll-SecondRAT) that specify the s-measure handling behavior during dual connectivity between two different RATs, if inter-RAT-sMeasureActivateAll-FirstRAT is set to TRUE, upon the fulfillment of the second RAT's s-measure criteria, starting to perform all the measurements configured by the first RAT.

Embodiment 9. A method in a user equipment (UE) operating in dual connectivity between a first radio access node employing a first radio access technology (RAT) and a second radio access node employing a second radio access technology (RAT), and currently connected to both the first node and the second node, and configured with an s-measure from the first node and another s-measure from the second node, the method comprising:

maintaining, by the UE, two configuration parameters (e.g. inter-RAT-sMeasureActivateAll-FirstRAT and inter-RAT-sMeasureActivateAll-SecondRAT) that specify the s-measure handling behavior during dual connectivity between two different RATs, if inter-RAT-sMeasureActivateAll-SecondRAT is set to TRUE, upon the fulfillment of the first RAT's s-measure criteria, starting to perform all the measurements configured by the second node.

Embodiment 10. A method according to any of the above embodiments 1 to 9, where the first RAT is LTE and the second RAT is NR, or vice versa.

Group B Embodiments

Embodiment 12A. A wireless device comprising:

processing circuitry configured to perform any of the steps of any of the Group A embodiments; and power supply circuitry configured to supply power to the wireless device.

Embodiment 12B. A user equipment (UE) comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

Embodiment 13. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.

Embodiment 14. The communication system of the previous embodiment, wherein the cellular network further includes a base station configured to communicate with the UE.

Embodiment 15. The communication system of the previous 2 embodiments, wherein:
the processing circuitry of the host computer is configured to execute a host application, thereby providing the user data; and
the UE's processing circuitry is configured to execute a client application associated with the host application.

Embodiment 16. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.

Embodiment 17. The method of the previous embodiment, further comprising at the UE, receiving the user data from the base station.

Embodiment 18. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A embodiments.

Embodiment 19. The communication system of the previous embodiment, further including the UE.

Embodiment 20. The communication system of the previous 2 embodiments, further including the base station, wherein the base station comprises a radio interface configured to communicate with the UE and a communication interface configured to forward to the host computer the user data carried by a transmission from the UE to the base station.

Embodiment 21. The communication system of the previous 3 embodiments, wherein:
the processing circuitry of the host computer is configured to execute a host application; and
the UE's processing circuitry is configured to execute a client application associated with the host application, thereby providing the user data.

Embodiment 22. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

Embodiment 23. A method implemented in a communication system including a host computer, a base station and a user equipment (UE), the method comprising:
at the host computer, receiving user data transmitted to the base station from the UE, wherein the UE performs any of the steps of any of the Group A embodiments.

Embodiment 24. The method of the previous embodiment, further comprising, at the UE, providing the user data to the base station.

Embodiment 25. The method of the previous 2 embodiments, further comprising:
at the UE, executing a client application, thereby providing the user data to be transmitted; and
at the host computer, executing a host application associated with the client application.

Embodiment 26. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

Embodiment 27. A method implemented in a communication system including a host computer, a base station and a user equipment (UE), the method comprising:
at the host computer, receiving, from the base station, user data originating from a transmission which the base station has received from the UE, wherein the UE performs any of the steps of any of the Group A embodiments.

Embodiment 28. The method of the previous embodiment, further comprising at the base station, receiving the user data from the UE.

Embodiment 29. The method of the previous 2 embodiments, further comprising at the base station, initiating a transmission of the received user data to the host computer.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

ADDITIONAL INFORMATION

1. Introduction

Some progress was made in the RAN2#99bis meeting related to measurement configuration and RRM. An email discussion was triggered to capture agreements in the DRAFT RRC specifications:

✉ [99bis#20][NR] RRM (Ericsson)
  After merge of TPs from this meeting in draft TS, continue to progress RRM, ASN.1 and corresponding field descriptions and procedure text. To include:
    updating to capture agreements from this meeting
    attempt to address identified FFS points
    identify FFS points that need online discussion at next meeting
  Intended outcome: TP (changes to draft TS) for next meeting
  Deadline: Thursday 2017-11-09

One topic that generated questions from companies was the way the agreements on the configuration of the s-Measure and UE behaviour should have been interpreted. This contribution aims to clarify the following issues:
  1/Configuration of s-Measure per RS type;
  2/UE behaviour based on s-Measure n EN-DC.

2. Discussion

The first time that s-Measure was discussed in RAN2 for NR was in RAN2#97-bis Spokane, and the following has been agreed:

---
. . .
4    When the serving cell quality is above S-Measure, the UE is not required to measure the IDLR RS and CSI-RS for neighbour cells.
. . .
---

In RAN2#99 Berlin, during EN-DC discussions, the following has been agreed:

---
. . .
3    In MR-DC, both MN and SN can configure independent s-Measures towards UE, with s-Measure configured by MN referring to PCell, and the s-Measure configured by SN referring to PSCell.
. . .
---

Then, in RAN2#99bis Prague, the following was greed based on an email discussion triggered in RAN2#99 Berlin on RRM (R2-1711963, Summary of email discussion [99#32] [NR] TP on RRM, Ericsson, RAN2#99bis Prague):

---
. . .
4:        Network can configure the RS type for s-Measure.
. . .
---

Based on the agreements described above, the TP on RRM was drafted in R2-713590, TP on RRM, Ericsson, RAN2#100 Reno. Therein, agreements for s-Measure on NR have been interpreted as follows:
  Network can configure the UE only with a single s-Measure value;
  Only RSRP is used as the measurement quantity;
  RS type can be configured i.e. CSI-RS or SS/PBCH block.

The reasoning for that interpretation comes from the origin of the agreement: the responses from most companies to e-mail discussion #32, more specifically to discussion 2.2 and 2.3, as shown below:

[99#32] [NR] TP on RRM (Ericsson)
To capture progress from this meeting.
The discussion can also resolve small FFS points (e.g. items taken from the LTE baseline that do not directly translate into NR without some discussion, and items (e.g. features added in later releases of LTE) from the LTE baseline for which there has not yet been an explicit decision whether to include them in NR).
Email discussion summary should provide a summary of any small decisions that were taken as well as provide a list of the remaining FFS points.
Intended outcome: TP submitted to next meeting
Deadline: Thursday 21/09/2017
Extract from email discussion #32 triggered after RAN2#99 Berlin (R2-1711963)
  Discussion 2.2: Companies are welcome to express their views on how in Rel-15 the network may configure s-Measure considering different RS Types (for a given measurement quantity e.g. RSRP). At least the following options have been identified from the previous discussion (but companies are welcome to provide other options):
    a/ Single s-Measure may be provided (network may configure RS type to associate to it);
      And if the serving cell quality is below this s-Measure then the UE shall perform measurements on all configured RS-types for neighbour cell
    b/ Multiple s-Measure (per RS-type) may be provided. Network may configure one or both;
      Option b.1: if the quality of either of the RS-type fall below its configured threshold, the UE shall perform measurements on all configured RS-types for neighbour cell
      Option b.2: if the quality of both the RS-type fall below their configured thresholds, the UE shall perform measurements on all configure RS-types for neighbour cell.

c/ Single s-Measure based on SS block only

| Company | Please, provide your preferred option and try to justify. |
| --- | --- |
| NEC | a/ Single s-Measure:<br>Our assumption is to detect and camp on the cell, the essential RS will be NR-SS and thus s-Measure can be simply applied to NR-SS only. So, even configuration indicating the RS type is not necessary. |
| ZTE | To be more explicit, we suggest to modify the options into following version, and split the optionb to capture all sub cases:<br>a/ Single s-Measure may be provided (network may configure RS type to associate to it);<br>And if the serving cell quality is below this s-Measure then the UE shall perform measurements on all configured RS-types for neighbour cell;<br>a.2/ network may configure RS type to associate to it;<br>b/ Multiple s-Measure (per RS-type) may be provided.<br>Network may configure one or both;<br>Option b.1: if the quality of either of the RS-type fall below its configured threshold, the UE shall perform measurements on all configured RS-types for neighbour cell;<br>Option b.2: if the quality of both the RS-type fall below their configured thresholds, the UE shall perform measurements on all configure RS-types for neighbour cell.<br>We prefer option b.1, due to the different characteristic of NR-SS and CSI-RS, CSI-RS RSRP may be more sensitive to the propagation environment, there may be cases that NR-SS remains above the configured s-measure while the CSI-RS RSRP indicates that the cell may become not a good choice for data transmission, so s-measure based on CSI-RS should be supported in NR. |
| Qualcomm | We prefer a/ because it is simple. Complex rule may need to be specified for option b/ in case of different observations in NR-SS and CSI-RS (e.g. when both NR-SS and CSI-RS's RSRP are large than s-Measure threshold, and same or different threshold for NR-SS or CSI-RS?) |
| Nokia | Single s-measure is sufficient - at least we have not identified benefits of multiple s-measures. |
| MediaTek | a/ Single s-Measure may be provided (network may configure RS type to associate to it)<br>In NR, measurement based on SSB is considered as baseline, and CSI-RS is configured if the network wants better accuracy.<br>Network is interested in only one RS at the same time, and a single s-Measure should be associated with this RS. |
| CATT | Prefer option a. S-Measure is a rough threshold to control UE to perform measurements on neighbouring cells. A single s-Measure is enough and it is simple. |
| Huawei, HiSilicon | c. s-Measure should be kept simple. |
| Sony | c/ Agree with Huawei. We think this option is useful from UE power consumption point of view. |
| Ericsson | We agree with CATT, Mediatek, Nokia, Qualcomm and NEC. In our view a/ is quite simple and sufficient for Rel-15 (preferred). ON the other hand b/ works, and has more flexibility, but it requires one more parameter and maybe is not needed. About c/, I thought about that possibility when drafting the template but did not include as I thought it would be a bit strange if network configures only CSI-RS based events (possible in the spec) and trigger neighbor cell measurements based on SSB s-measurements as proposed in c/? And, considering the cost of having a single parameter is not high, a/ seemed anyway quite simple. Actually a/ comes from a suggestion in the previous email discussion. |
| Lenovo/MotM | a) is sufficient. |
| AT&T | Option c is not acceptable because a carrier could be configured without SS blocks. Option b-1 is preferable because there could be significant difference in quality measured on SS Block vs. CSI-RS. We understand the argument of simplicity for Option a. However, considering that Option a can be viewed as a subset of Option b-1, we prefer to support Option b-1. |
| Intel | Option (a) is sufficient. NR-SS can be used. NR-SS should be a wider beam than CSI-RS, so if NR-SS satisfy s-Measure, CSI-RS most likely will satisfy as well. However, if company would like to configure by NW, then option (a) is preferred. |
| Interdigital | Although option b is more optimal given SSB and CSI-RS can be transmitted with different antenna gain or beam pattern, we think option a is sufficient. We also think option c is not applicable when CSI-RS events are configured only. |
| LG | a/ Single s-measure is sufficient. |
| Panasonic | Option (a) is preferred as it simplifies the measurement procedure. |
| OPPO | Agree with Huawei that the single S-Measure based on NR-SS is sufficient. |

| Company | Please, provide your preferred option and try to justify. |
|---|---|
| Samsung | Assuming RRM measurements are merely for RRC involved/inter-cell mobility, a single measure (and parameter) indicating current cell is so good that nCell measurements are not needed |

Summary of discussions 2.2 and 2.3: Most companies agree that network can configure only a single s-Measure with a configurable RS Type (SS block or CSI-RS). The UE shall perform neighbour cell measurements if the PCell RSRP is below this configured s-Measure threshold. The current DRAFT ASN.1 structure follows that and defines a single s-MeasureConfig IE in measConfig where network can only choose either to configure ssb-rsrp or csi-rsrp as measurement quantities.

Extract from email discussion #32 triggered after RAN2#99 Berlin (R2-1711963)

As it can be seen, the following can be observed from the responses:
Almost all companies (15) preferred a single s-Measure threshold;
All companies prefer only RSRP;
Almost all companies (11) preferred a single value with configurable RS-type controlling all neighbour cell measurements i.e. no further optimizations distinguishing neighbouring measurements per RS type and/or beam and cell measurements.
Observation 1 In email discussion #32, most companies preferred that the network can configure only a single s-Measure with configurable RS Type (SS block or CSI-RS). The UE shall perform neighbour cell measurements if the PCell RSRP is below this configured s-Measure threshold. The merged TP follows that and defines a single s-MeasureConfig IE in measConfig where network can only choose either to configure ssb-rsrp or csi-rsrp as measurement quantities.

Based on the conclusions from email discussion #32, the TP on RRM has been drafted R2-713590. Hence, the following is proposed:
Proposal 1 For s-Measure configuration per RS type, keep the interpretation in the TP on RRM (R2-1713590) i.e. based on email discussion #32 summary (R2-1711963). Reviews on the exact formulation in R2-1713590 are possible.

2.1 UE Behaviour Based on s-Measure in EN-DC
In RAN2#99 Berlin, during EN-DC discussions, the following has been agreed:

...
3 In MR-DC, both MN and SN can configure independent s-Measures towards UE, with s-Measure configured by MN referring to PCell, and the s-Measure configured by SN referring to PSCell.
...

Despite the agreement, as correctly pointed out by at least one company in the RRM email discussion #20, RAN2 has not discussed the UE behaviour when two s-measure values are configured in EN-DC, before and after EN-DC setup under different conditions.
Perhaps the simplest solution, also assumed at least temporarily in the current RRM TP (R2-713590), seems to be some level of independency of procedures i.e. the s-Measure configured by EUTRAN controls the triggering of neighbour cells measurements configured by EUTRAN, while the s-Measure configured by NG-RAN controls the triggering of neighbour cells measurements configured by NG-RAN.

Observation 2 Perhaps the simplest interpretation of the agreement in terms of UE behaviour is that each independently configured s-Measure values control each measConfig provided by each RAT, NG-RAN and EUTRAN. Hence, RAN2 should discuss whether that really works.

It is worth recapitulating that s-Measure has been defined for triggering neighbour measurements to support coverage based handovers i.e. neighbour measurements are triggered when the PCell RSRP drops below the configurable s-Measure value. In EUTRAN, if the network supports Carrier Aggregation (CA) and/or Dual Connectivity (DC), in addition to handovers, the network would not even bother of configuring the s-Measure or it would set it as low as possible, as the setup of a candidate PSCell/SCell should not directly depend whether the PCell quality is good or not.

Observation 3 When EUTRAN configures the UE to perform measurements, for the purpose of setting up CA and/or DC, in addition to handovers, EUTRAN either sets s-Measure to its lowest value or simply does not configure it. In other words, DC/CA makes s-Measure quite useless.

Hence, as in EN-DC, inter-RAT handovers from LTE to NR are not even supported, a potential consequence could be that the EUTRAN will never configure s-Measure for EN-DC capable UEs before EN-DC is setup.

Observation 4 When EUTRAN configures the UE to perform measurements, for the purpose of EN-DC, EUTRAN might never configure s-Measure.

In principle, one could say that the usage of s-Measure is limited when EUTRAN only wants to support inter-RAT handovers from LTE to NR. However, as NR would be highest priority RAT, if EUTRAN configures measurements on NR frequencies, EUTRAN wants the UE to go back to NR as fast as possible if coverage is good enough. Hence, EUTRAN will never make the UE wait to perform NR measurements, or even more generally, any higher priority RAT measurements. Hence, even for that case of inter-RAT handovers, s-Measure would not be so useful for NR measurements. Hence, to make s-Measure useful in EN-DC at least for LTE measurements, the following is proposed:

Proposal 2 UE shall perform NR measurements configured by EUTRAN upon receiving measConfig, regardless if s-Measure is configured or not.

After EN-DC is setup, NG-RAN may configure s-Measure, as measurements provided to support SCG changes could potentially be delayed when the SCG PCell quality is very good. And, if only one s-Measure is configured (by NG-RAN), UE shall perform neighbour measurements configured by NG-RAN when the SCG PCell quality is below that configured s-Measure.

Proposal 3 If NG-RAN configures s-Measure, after EN-DC setup, UE shall perform neighbour NR measurements configured by NG-RAN if SCG PCell RSRP is below the configured s-Measure. FFS LTE measurements configured by NG-RAN.

As the s-Measure threshold configured by EUTRAN, as proposed in P1, does not affect the way the UE perform NR measurements configured by EUTRAN, P3 can be easily extended so that the s-Measure condition only matters for NG-RAN configured measurements, while the s-Measure configure by EUTRAN is not applicable for NR measurements configured by EUTRAN.

Notice that the procedure based on P1-P3 becomes quite clear when LTE and NR have configured different measurement objects i.e. the ones configured by EUTRAN are always measured, while the ones configured by NG-RAN could depend on s-Measure. However, perhaps some discussion is needed for the case where the same measurement object is configured by EUTRAN and NG-RAN, especially in the case of NR measurement objects where different RS types in different frequency locations can be configured in the same measurement object. In our view, the UE considers that the same measurement associated to an NR measObject has been configured if both measurement configure the following:

the same RS type;
the same configured quantities (trigger and reporting) for cell measurements;
the same configured beam reporting information (or same measured quantity);

In other words, when the UE is in EN-DC and, based on EUTRAN configuration the UE is performing measurements associated to NR measObject(s), and the NR s-Measure triggers the UE to perform measurements on the same measurement object (e.g. same ARFCN), the UE shall perform the additional measurements, if any i.e.: on additional RS type (e.g. CSI-RS measurements are not configurable via EUTRAN), different configured quantities (trigger and reporting) for cell measurements and different configured beam reporting information (or same measured quantity).

Proposal 4 If the s-measure condition configured by NG-RAN is fulfilled when the UE is in EN-DC performing measurements on the same NR measurement objects configured by EUTRAN and NG-RAN, UE shall perform the additional measurements configured by NG-RAN (if any) i.e. additional RS (e.g. CSI-RS based measurements), additional measurement quantities for cell measurements (trigger and reporting), additional beam measured quantities.

3. Conclusion

In section 2 the following observations were made:
Proposal 1 Observation 1 In email discussion #32, most companies preferred that the network can configure only a single s-Measure with configurable RS Type (SS block or CSI-RS). The UE shall perform neighbour cell measurements if the PCell RSRP is below this configured s-Measure threshold. The merged TP follows that and defines a single s-MeasureConfig IE in measConfig where network can only choose either to configure ssb-rsrp or csi-rsrp as measurement quantities.
Proposal 2 Observation 2 Perhaps the simplest interpretation of the agreement in terms of UE behaviour is that each independently configured s-Measure values control each measConfig provided by each RAT, NG-RAN and EUTRAN. Hence, RAN2 should discuss whether that really works.
Proposal 3 Observation 3 When EUTRAN configures the UE to perform measurements, for the purpose of setting up CA and/or DC, in addition to handovers, EUTRAN either sets s-Measure to its lowest value or simply does not configure it. In other words, DC/CA makes s-Measure quite useless.
Proposal 4 Observation 4 When EUTRAN configures the UE to perform measurements, for the purpose of EN-DC, EUTRAN might never configure s-Measure.

Based on the discussion in section 2, the following was proposed:
Proposal 5 For s-Measure configuration per RS type, keep the interpretation in the TP on RRM (R2-1713590) i.e. based on email discussion #32 summary (R2-1711963). Reviews on the exact formulation in R2-1713590 are possible.
Proposal 6 UE shall perform NR measurements configured by EUTRAN upon receiving measConfig, regardless if s-Measure is configured or not.
Proposal 7 If NG-RAN configures s-Measure, after EN-DC setup, UE shall perform neighbour NR measurements configured by NG-RAN if SCG PCell RSRP is below the configured s-Measure. FFS LTE measurements configured by NG-RAN.
Proposal 8 If the s-measure condition configured by NG-RAN is fulfilled when the UE is in EN-DC performing measurements on the same NR measurement objects configured by EUTRAN and NG-RAN, UE shall perform the additional measurements configured by NG-RAN (if any) i.e. additional RS (e.g. CSI-RS based measurements), additional measurement quantities for cell measurements (trigger and reporting), additional beam measured quantities.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1×Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method in a wireless device currently connected to a first radio access node and configured with an s-measure by the first radio access node that controls when the wireless device starts performing measurements, the method comprising:
upon configuration by the first radio access node to perform measurements on a first radio access technology, RAT, starting to perform the measurements when the first radio access node's s-measure criteria is fulfilled; and
upon configuration by the first radio access node to perform measurements on a second RAT, starting to perform the measurements on the second RAT whether the first radio access node's s-measure criteria is fulfilled or not.

2. The method of claim 1, wherein the wireless device is capable of operating in dual connectivity between the first radio access node employing the first RAT and a second radio access node employing a second RAT.

3. The method of claim 1, wherein the first RAT is LTE and the second RAT is NR.

4. The method of claim 1, wherein the first RAT is NR and the second RAT is LTE.

5. The method of claim 1, wherein:
the wireless device is served by the first radio access node in a first cell and zero or more secondary cells, the first cell comprising a primary cell, Pcell, and
the first radio access node's s-measure criteria is fulfilled when a cell quality level of the primary cell, Pcell, falls below a threshold indicated in the first radio access nodes's s-measure configuration.

6. A method in a wireless device operating in dual connectivity between a first radio access node employing a first radio access technology, RAT, and a second radio access node employing a second RAT, wherein the wireless device is currently connected to both the first radio access node and the second radio access node and is configured with a first s-measure from the first radio access node and a second s-measure from the second radio access node, the method comprising:
upon configuration by the first radio access node to perform measurements on the first RAT, starting to perform the measurements when the first radio access node's s-measure criteria is fulfilled; and
upon configuration by the first radio access node to perform measurements on the second RAT, starting to perform the measurements on the second RAT, whether the first radio access node's s-measure criteria is fulfilled or not.

7. The method of claim 6, further comprising:
upon configuration by the second radio access node to perform measurements on the second RAT, starting to perform the measurements when the second radio access node's s-measure criteria is fulfilled; and
upon configuration by the second radio access node to perform measurements on the first RAT, starting to perform the measurements on the first RAT, whether the second radio access node's s-measure criteria is fulfilled or not.

8. The method of claim 6, wherein the first RAT is LTE and the second RAT is NR.

9. The method of claim 6, wherein the first RAT is NR and the second RAT is LTE.

10. The method of claim 6, wherein:
the wireless device is served by the first radio access node in a first cell and zero or more secondary cells, and wherein the first cell comprises a primary cell, Pcell,
the wireless device is served by the second radio access node in a second cell and zero or more secondary cells, and wherein the second cell comprises a primary secondary cell, PSCell,
the first radio access node's s-measure criteria is fulfilled when the cell quality level of the PCell falls below a threshold indicated in the first radio access nodes's s-measure configuration, and
the second radio access node's s-measure criteria is fulfilled when the cell quality level of the primary secondary cell, PSCell, falls below a threshold indicated in the second radio access nodes's s-measure configuration.

11. A wireless device currently connected to a first radio access node and configured with at least one s-measure by the first radio access node that controls when the wireless device starts performing measurements, the wireless device comprising:
processing circuitry operable to:
upon configuration by the first radio access node to perform measurements on a first radio access technology, RAT, starting to perform the measurements when the first radio access node's s-measure criteria is fulfilled; and
upon configuration by the first radio access node to perform measurements on a second RAT, starting to perform the measurements on the second RAT, whether the first radio access node's s-measure criteria is fulfilled or not,
power supply circuitry configured to supply power to the wireless device.

12. The wireless device of claim 11, wherein the wireless device is capable of operating in dual connectivity between the first radio access node employing the first RAT and a second radio access node employing a second RAT.

13. The wireless device of claim 11, wherein:
the wireless device is served by the first radio access node in a first cell and zero or more secondary cells, the first cell comprising a primary cell, PCell, and
the first radio access node's s-measure criteria is fulfilled when a cell quality level of the PCell falls below a threshold indicated in the first radio access nodes's s-measure configuration.

14. A wireless device operating in dual connectivity between a first radio access node employing a first radio access technology, RAT, and a second radio access node employing a second RAT, wherein the wireless device is currently connected to both the first radio access node and the second radio access node and is configured with a first s-measure from the first radio access node and a second s-measure from the second radio access node, the wireless device comprising:
processing circuitry operable to:
upon configuration by the first radio access node to perform measurements on the first RAT, start to perform the measurements when the first radio access node's s-measure criteria is fulfilled; and
upon configuration by the first radio access node to perform measurements on the second RAT, start to perform the measurements on the second RAT, whether the first radio access node's s-measure criteria is fulfilled or not; and
power supply circuitry configured to supply power to the wireless device.

15. The wireless device of claim 14, wherein the processing circuitry is operable to:
upon configuration by the second radio access node to perform measurements on the second RAT, start to perform the measurements when the second radio access node's s-measure criteria is fulfilled; and
upon configuration by the second radio access node to perform measurements on the first RAT, start to perform the measurements on the first RAT, whether the second radio access node's s-measure criteria is fulfilled or not.

16. The wireless device of claim 14, wherein the first RAT is LTE and the second RAT is NR.

17. The wireless device of claim 14, wherein the first RAT is NR and the second RAT is LTE.

18. The wireless device of claim 14, wherein:
the wireless device is served by the first radio access node in a first cell and zero or more secondary cells, the first cell comprising a primary cell, PCell,
the wireless device is served by the second radio access node in a second cell and zero or more secondary cells, the second cell comprising a primary secondary cell, PSCell,
the first radio access node's s-measure criteria is fulfilled when the cell quality level of the PCell falls below a threshold indicated in the first radio access nodes's s-measure configuration, and
the second radio access node's s-measure criteria is fulfilled when the cell quality level of the PSCell falls below a threshold indicated in the second radio access nodes's s-measure configuration.

19. A system for triggering measurements in LTE-NR interworking, the system comprising:
a first radio access node employing a first radio access technology, RAT;
a second radio access node employing a second RAT; and
a wireless device currently connected to the first radio access node and configured with an s-measure by the first radio access node that controls when the wireless device starts performing measurements;

the wireless device configured, upon configuration by the first radio access node, to perform measurements on the first RAT, wherein the wireless devices starts to perform the measurements when the first radio access node's s-measure criteria is fulfilled; and wherein the wireless device is further configured, upon configuration by the first radio access node, to perform measurements on the second RAT, wherein the wireless device starts to perform the measurements on the second RAT whether or not an s-measure criteria associated with the first RAT is fulfilled.

* * * * *